United States Patent
Fish et al.

(10) Patent No.: US 8,767,102 B2
(45) Date of Patent: Jul. 1, 2014

(54) METHOD TO IMPROVE FILTER WHEEL IMAGING SYSTEM DATA CAPTURE RATE AND ADD FUNCTIONALITY THROUGH THE USE OF AN IMPROVED FILTER WHEEL DESIGN

(75) Inventors: David E. Fish, Littleton, CO (US); Emil Janicek, Westminster, CO (US)

(73) Assignee: Pixelteq, Inc., Largo, FL (US)

( * ) Notice: Subject to any disclaimer, the term of this patent is extended or adjusted under 35 U.S.C. 154(b) by 20 days.

(21) Appl. No.: 13/559,697

(22) Filed: Jul. 27, 2012

(65) Prior Publication Data
US 2013/0038782 A1 Feb. 14, 2013

Related U.S. Application Data

(60) Provisional application No. 61/522,795, filed on Aug. 12, 2011.

(51) Int. Cl.
*H04N 9/083* (2006.01)
*H04N 5/225* (2006.01)

(52) U.S. Cl.
CPC .................................. *H04N 5/2254* (2013.01)
USPC ........................................... 348/270; 348/360

(58) Field of Classification Search
None
See application file for complete search history.

(56) References Cited

U.S. PATENT DOCUMENTS

| | | | |
|---|---|---|---|
| 7,113,152 B2 | 9/2006 | Ben-David et al. | |
| 7,161,665 B2 * | 1/2007 | Johnson | 356/73 |
| 2009/0273763 A1 * | 11/2009 | Kjaer | 353/84 |
| 2010/0305455 A1 * | 12/2010 | Frangioni | 600/476 |
| 2011/0128545 A1 | 6/2011 | Cox et al. | |

* cited by examiner

*Primary Examiner* — Twyler Haskins
*Assistant Examiner* — Angel L Garces-Rivera
(74) *Attorney, Agent, or Firm* — Dennis L. Cook, Esq.

(57) ABSTRACT

This disclosure describes a method of improving filter wheel imaging data capture and other functionality through use of an improved filter wheel design with pie shaped filter segments, continuously rotating image capture, multiple filtered images, and easily removable and attachable filter segments.

4 Claims, 8 Drawing Sheets

4a

4b

Sensor Covered, Start Capture

4c

Next Filter, Stop Capture

4d

Figure 1
Prior Art
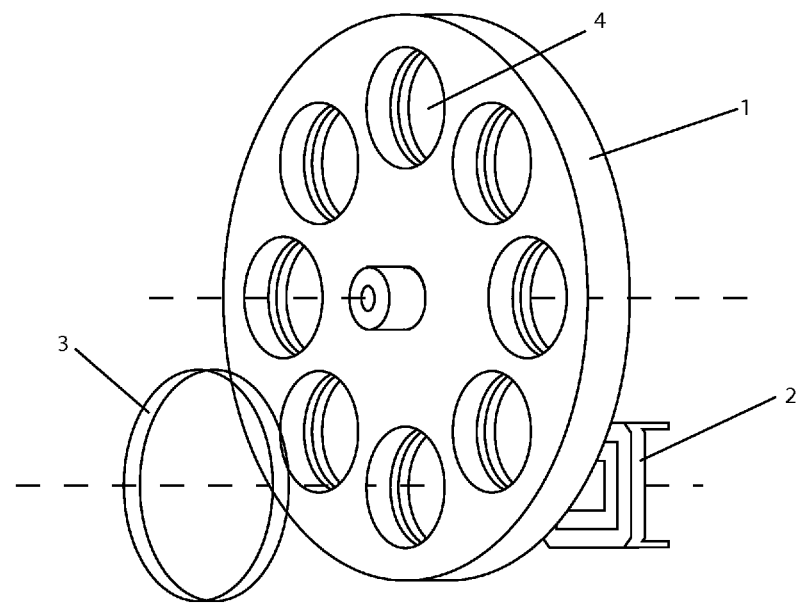
1a.
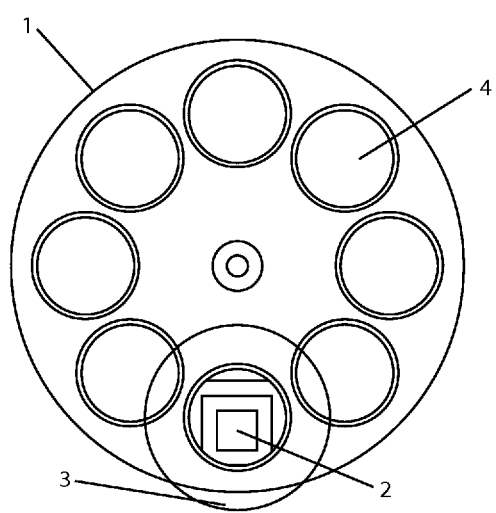
1b.
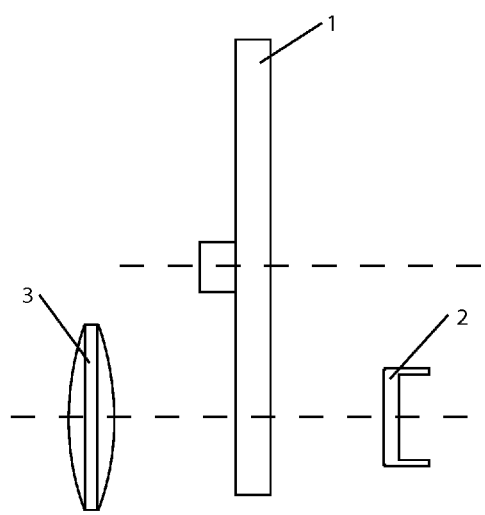
1c.

Figure 2
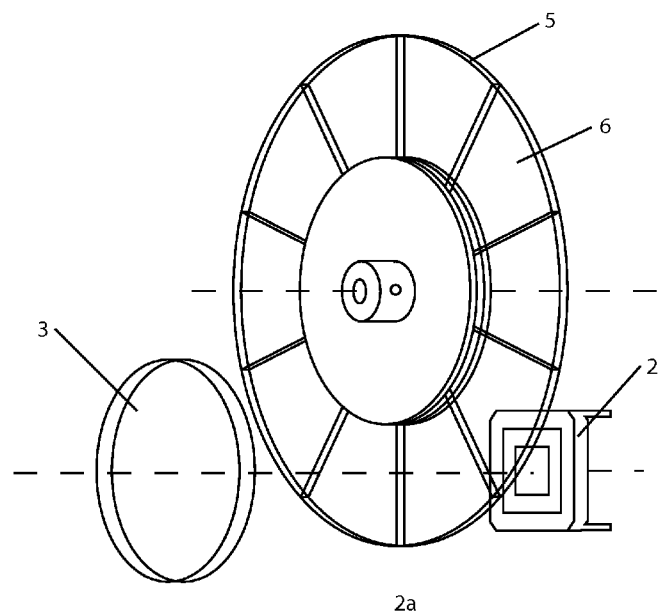
2a
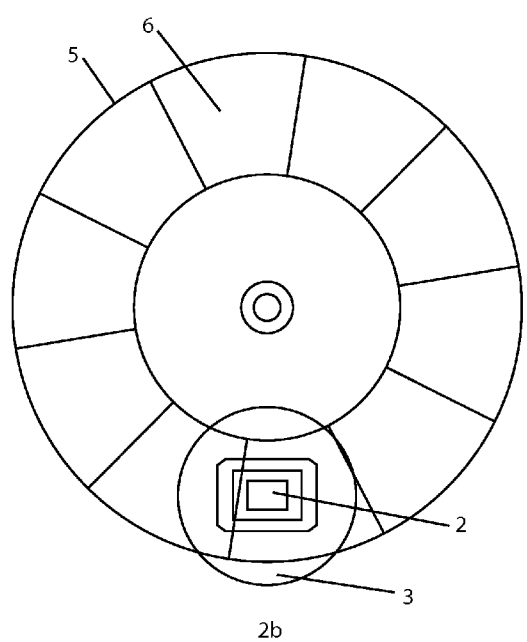
2b
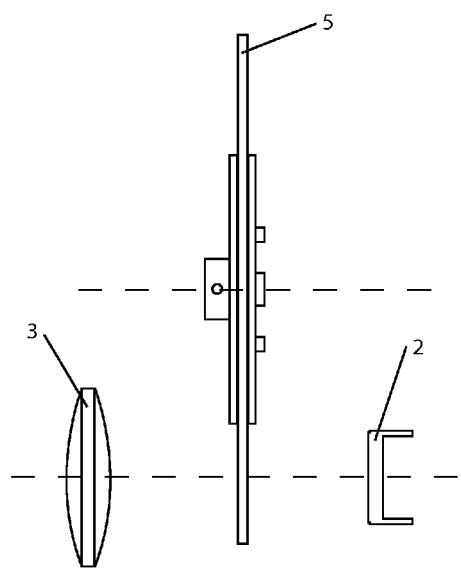
2c

Figure 4
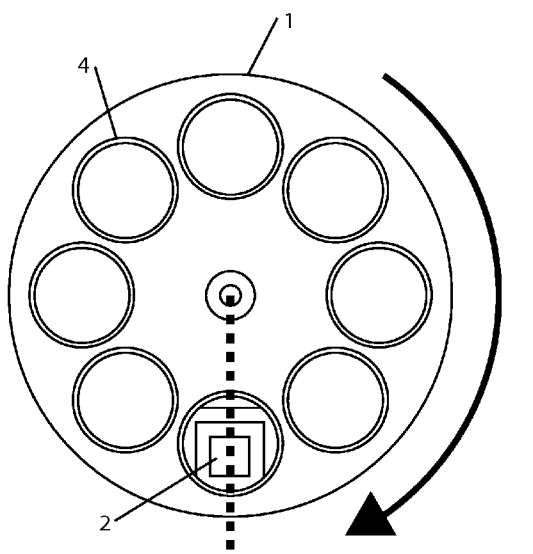
4a
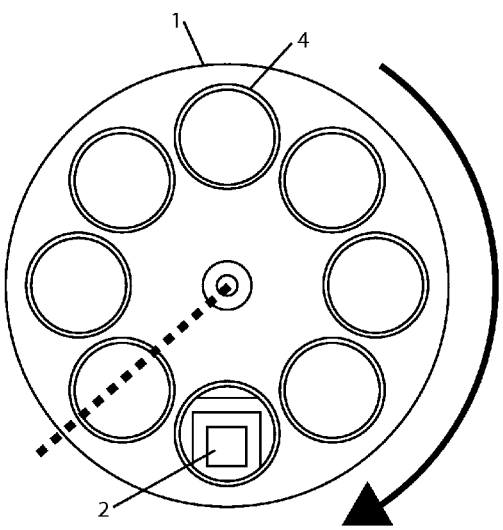
4b
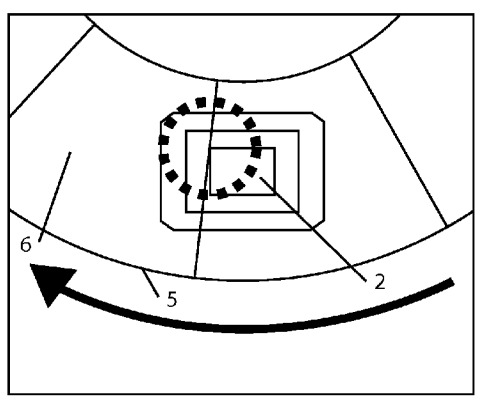
Sensor Covered, Start Capture
4c
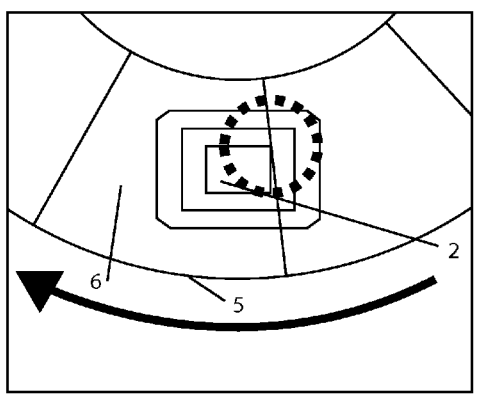
Next Filter, Stop Capture
4d Figure 5
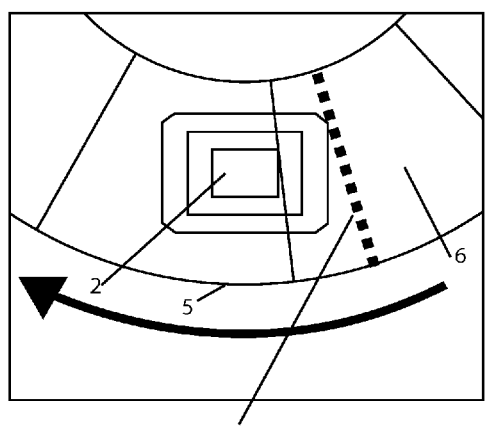
Start Image Capture
5a
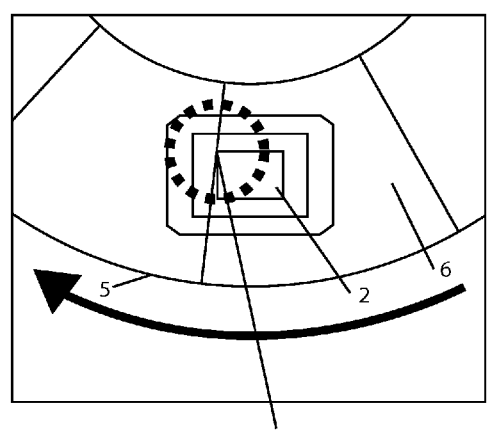
Terminate Image Capture
5b

METHOD TO IMPROVE FILTER WHEEL IMAGING SYSTEM DATA CAPTURE RATE AND ADD FUNCTIONALITY THROUGH THE USE OF AN IMPROVED FILTER WHEEL DESIGN

CROSS-REFERENCE TO RELATED APPLICATION

The present application claims the benefit of previously filed Provisional Patent Application, Ser. No. 61/522,795.

FIELD OF THE INVENTION

This invention belongs to the field of image-capture optical devices. More specifically it is a method of improving filter wheel imaging data capture and other functionality through use of an improved filter wheel design with pie shaped filter segments, continuously rotating image capture, and multiple filtered images.

BACKGROUND OF THE INVENTION

Filter wheels are used in many image-capture systems. While these filter wheel systems perform well they have found limited market success due to their slow image capture rates. In essence, the weakness in prior art systems is the time required for the filter wheel to sequence/rotate between filters, even in recent attempts to make the process faster, as shown in U.S. Publication 2011/0128545 to Cox et al. for a Fast-Indexing Filter Wheel And Method Of Use.

By changing the construction of the filter wheel one can make significant improvements to the time required to change between filters on a filter wheel. Additional changes to the rotational drive mechanism allow optimization and synchronization between filter position and image-capture timing.

BRIEF SUMMARY OF THE INVENTION

The invention of this disclosure is a method of improving filter wheel imaging data capture and other functionality through use of an improved filter wheel design with pie shaped filter segments, continuously rotating image capture, and multiple filtered images. The filter wheel can also be constructed to allow easy interchanging of filter segments.

BRIEF DESCRIPTION OF THE DRAWINGS

For a fuller understanding of the nature and objects of the invention, reference should be made to the following detailed description, taken in connection with the accompanying drawings, in which:

FIGS. 1(a), 1(b), and 1(c) show perspective, front, and side views of a typical prior art imaging filter wheel, generic sensor, and generic lens.

FIGS. 2(a), 2(b), and 2(c) show perspective, front, and side views of the new imaging filter wheel with pie shaped segments, generic sensor, and generic lens.

FIGS. 4(a), 4(b), 4(c), and 4(d) show a comparison of an image capture sequence between a typical prior art filter wheel and the new imaging filter wheel.

FIGS. 5(a), and 5(b) show a method of multiple filter image capture.

DESCRIPTION OF THE PREFERRED EMBODIMENT

As shown in FIG. 1's perspective, front, and side views prior filter wheel multi-image capture systems normally consist of three key components: A filter wheel (1) with round or square filters (4) [Generic version shown but is typical of design]; an imaging sensor (2); and an imaging lens (3). In prior art systems the filter wheel drive mechanism typically rotates the wheel in "steps" stopping at each filter position to allow an image, projected by the lens (3) through the filter wheel (1), to be captured by the sensor (2). This type of rotational motion limits the frequency at which images can be captured through the different filters (4) due to the time required to accelerate-move-decelerate-stop the filter wheel (1) for each captured image.

Figure 3:
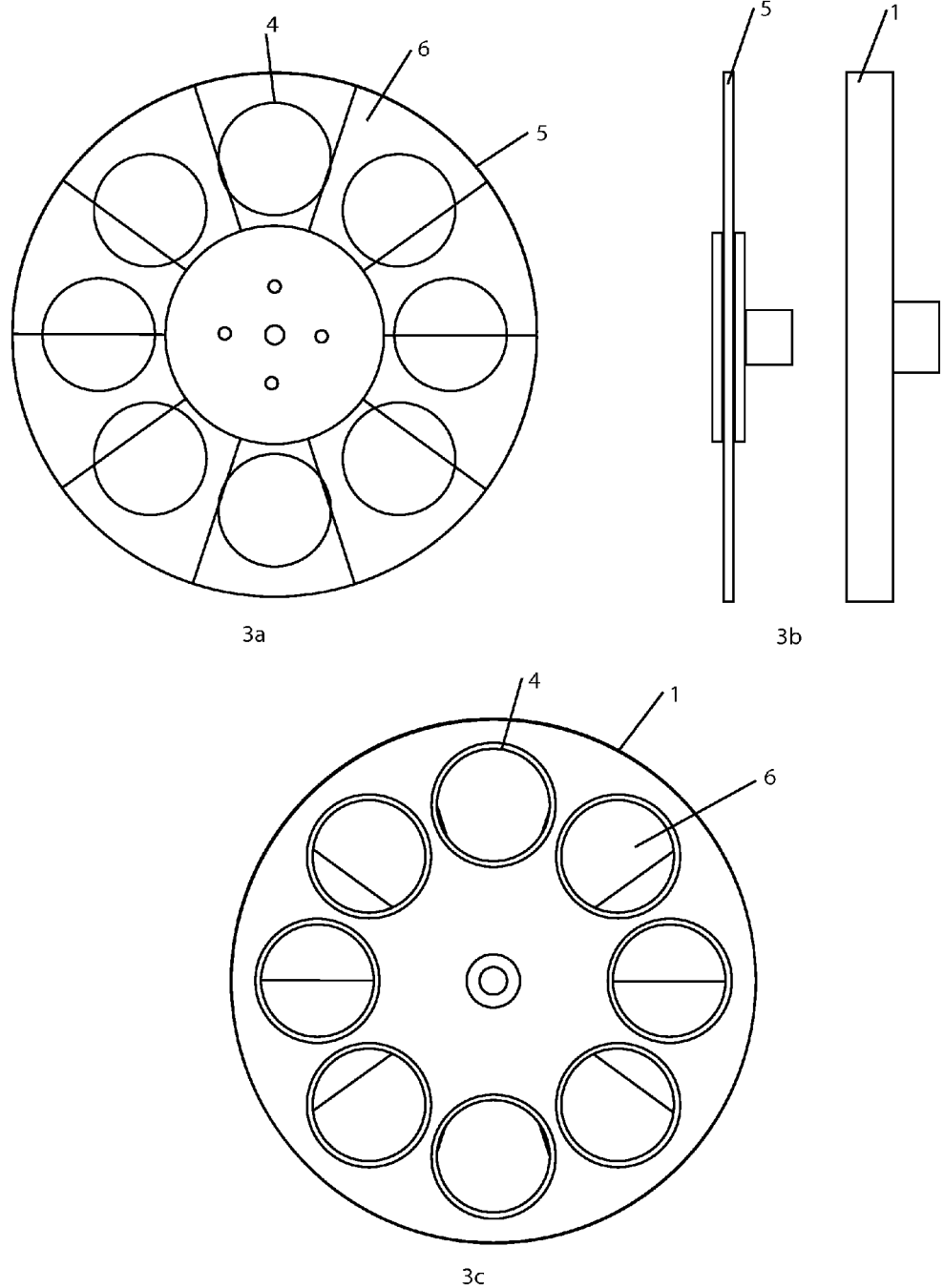
FIGS. 3(a), 3(b), and 3(c) show front, side, and back views for comparison of the new imaging filter wheel with a typical prior art filter wheel.

The invention of this disclosure shown in FIG. 2's perspective, front, and side views makes clear that by using a filter wheel (5) with "pie" shape filter segments (6) one can optimize the available space on the filter wheel (5) which can result in an increased number of filter segments (6) for the same diameter filter wheel (5). FIG. 3's front, side, and back views show a comparison between the prior art filter wheel (1) design and the filter wheel (5) design described in this disclosure. As can easily be seen from the figure both filter wheels (1 & 5) have similar diameters but the new filter wheel (5) has more filter segments (6).

FIG. 4 shows that the change in filter shape decreases the amount of rotation angle required to rotate the filter wheel (5) between filter segments (6). By the addition of rotational position sensors (not shown) one can capture images without stopping the filter wheel (5) rotation. As discussed above prior art filter wheels (1) rotate to each filter (4) position then stop to allow image capture. This is necessary to ensure proper registration of the filter (4) to the image sensor (2). The invention of this disclosure continuously rotates the filter wheel (5). Rotational position sensors (not shown) are used to synchronize the timing of the image capture and filter segment (6) position. Once a filter segment (6) has fully covered the sensor (2), initiation of the image capture can begin. Image capture must stop prior to the next filter segment (6) in the sequence rotating in front of the sensor (2).

Also the preferred embodiment this invention can capture images during the time the sensor (2) is covered by two adjacent filter segments (6) as shown in FIGS. 5(a) and 5(b). This is accomplished by initiating an image capture (global shutter sensor) prior to the instant the sensor (2) is covered by two filter segments (6) and terminating the image capture after the second filter segment (6) covers the sensor (2). This allows images to be captured with both filter segments (6) generating a "combined" filtered image. Many times during image analysis the absolute intensity differences between two filter segments (6) is important. By capturing an image using both filter segments (6) at the same time the complexity of the analysis algorithms can be decreased.

Figure 6:
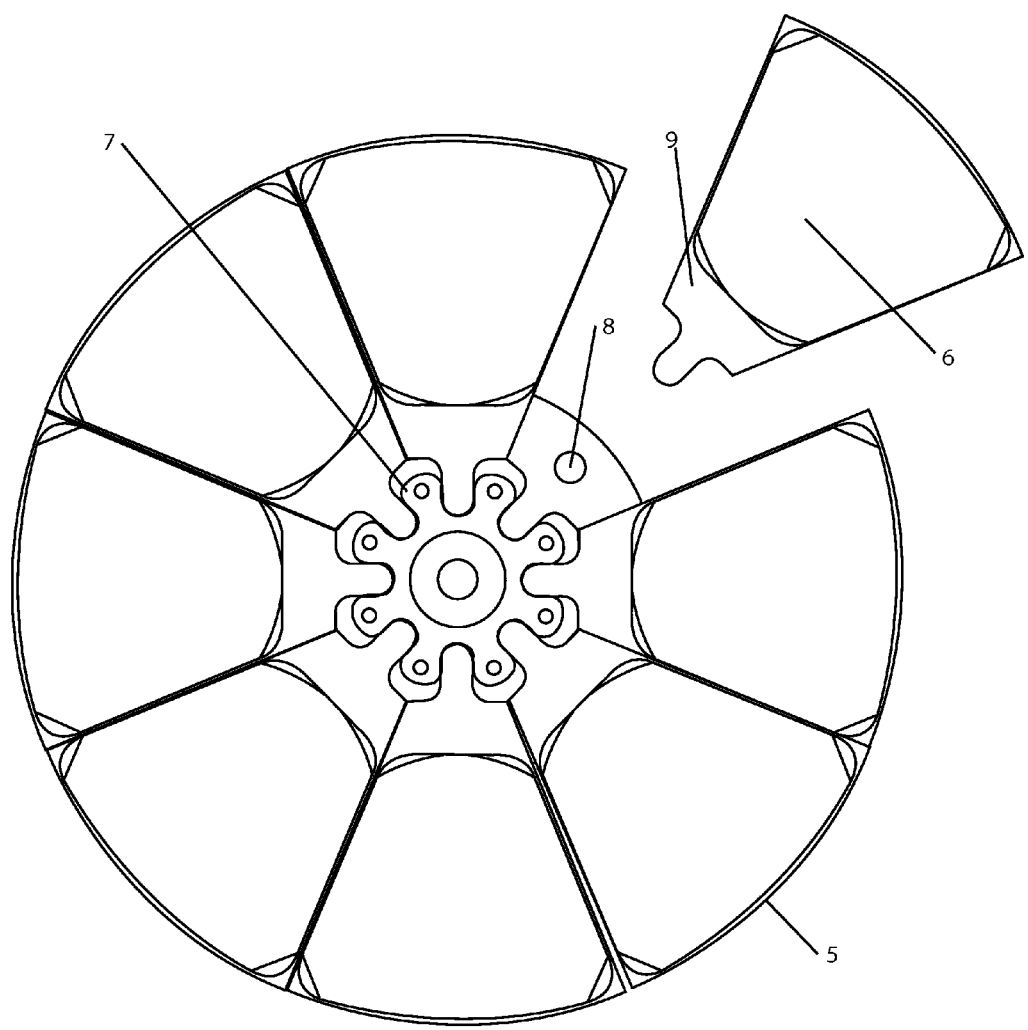
FIG. 6 shows the system with interchanging filter segments.
Figure 7:
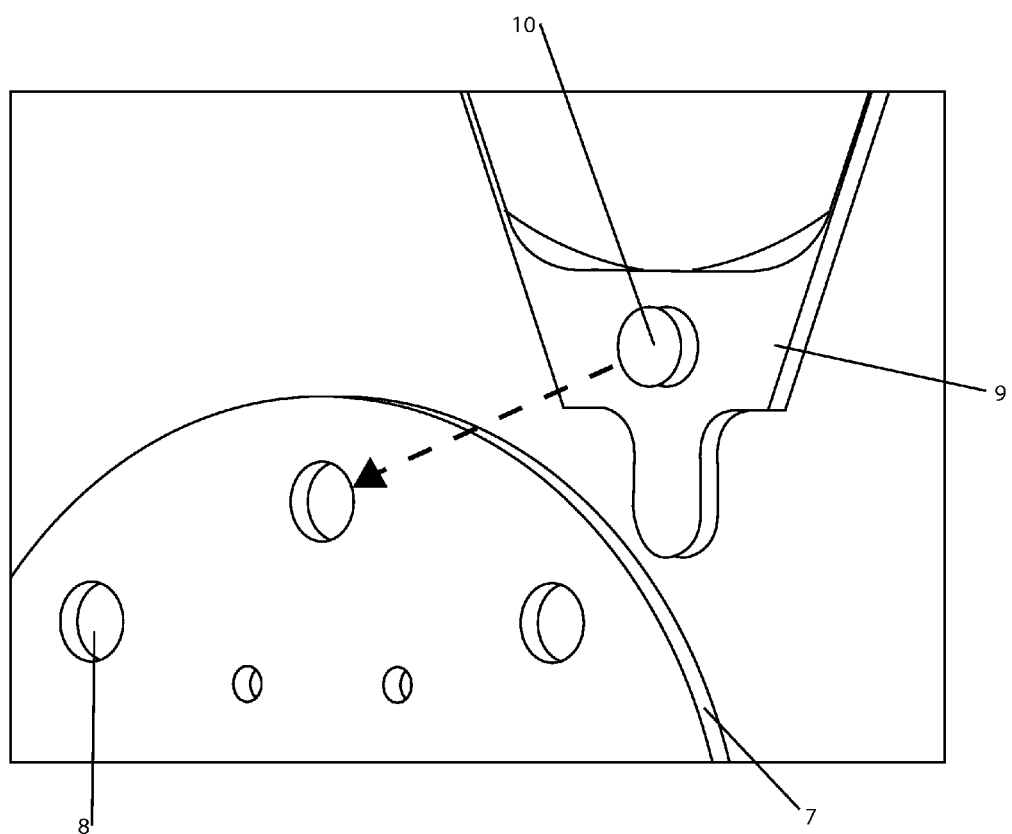
FIG. 7 shows a method of interchanging filter segments.
Figure 8:
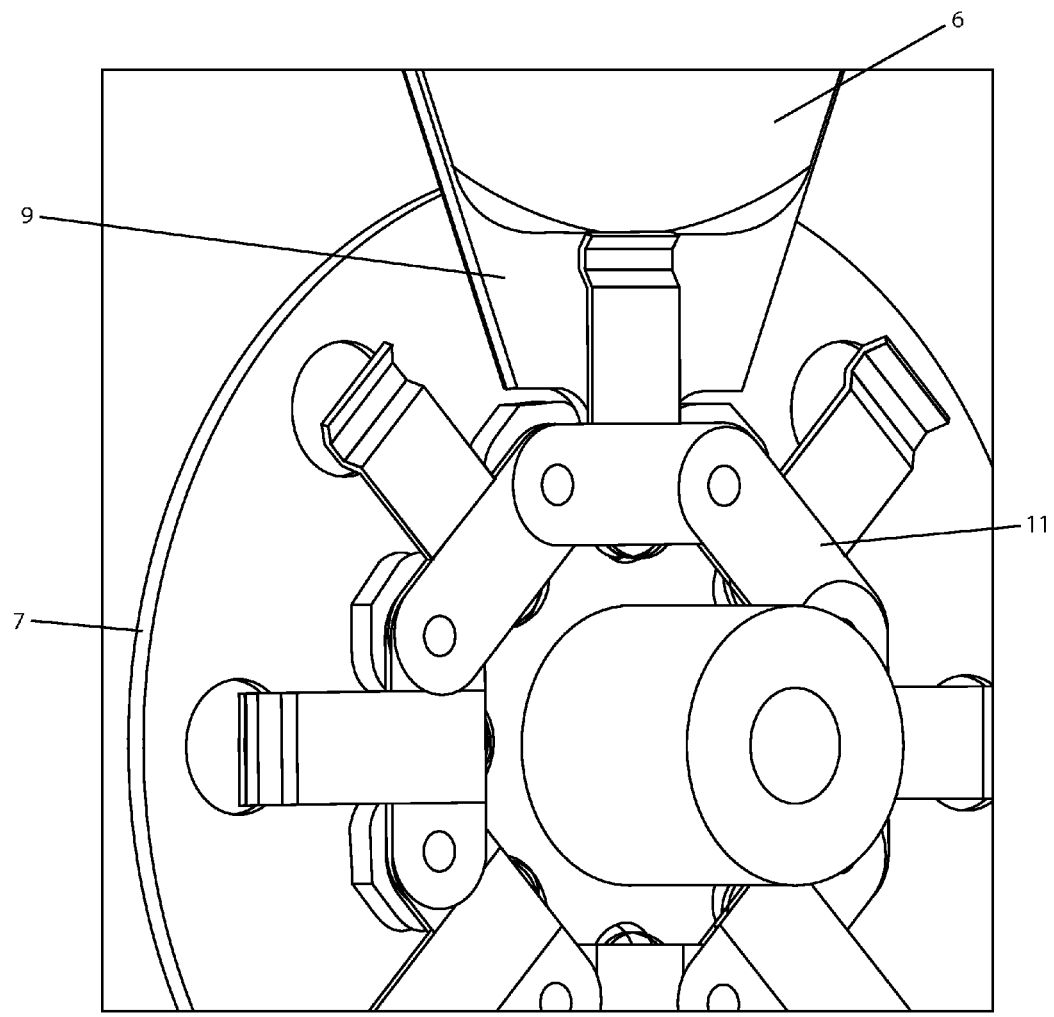
FIG. 8 shows a method of interchanging filter segments.

The invention of this disclosure can be used in most, if not all filter wheel image capture system applications since the filter wheel (5) can be constructed to have interchangeable filter segments such as shown in FIG. 6. In one embodiment shown in FIG. 7 the filter wheel hub (7) has a hole (8) in it and the filter frame (9) holding the filter segment (6) has a pin (10) that fits in the hole (8). As can be seen from these figures the filter wheel hub (7) and filter frame (9) have meshing teeth similar to the meshing of a typical gear. This feature keeps angular positioning by keeping the filter frame (9) from rotating about the axis of the pin (10) and hole (8). FIG. 8 shows the mechanical connection of the filter frame (9) to the filter wheel hub (7) by use of a spring mechanism (11). The spring mechanism (11) is attached to the filter wheel hub (7) such that once the filter frame (9) is meshed in the filter wheel hub (7) and the pin (10) is inserted in the hole (8) the spring mechanism (11) holds the filter frame (9) securely in place. To remove a filter segment (6) a force can be applied to the filter frame (9) axially to the filter wheel hub and pushing against the spring mechanism (11) far enough to disengage the pin (10) from the hole (8) thus allowing the filter frame (9) to be pulled out in the radial direction. Other methods of interchangeability can also be constructed by those skilled in the art once given the benefit of this disclosure.

The filter wheel's (5) rotational speed is limited by the operational features of the sensor (2). In one embodiment the method uses a sensor (2) with a 30 fps (frames per second) maximum rate. By maximizing the data packet size and using the maximum integration time of 33 mS, one can achieve image capture rates exceeding 25 fps. Improved performance can be obtained by a faster sensor (2), as determined by how fast the sensor (2) can capture an image and then be prepared to capture the next image. The images are captured in sequence with the filter segments (6) on the filter wheel (5).

Since certain changes may be made in the above described method for an improved filter wheel for a image capture device without departing from the scope of the invention herein involved, it is intended that all matter contained in the description thereof or shown in the accompanying figures shall be interpreted as illustrative and not in a limiting sense.

What is claimed is:

1. A method of increasing the image capture rate of a filter wheel image capture system having a lens creating an optical axis, a filter wheel having three or more triangle shaped filter wheel filter segments enclosed in frames, and an image capture sensor comprising:

said filter segments enclosed in frames with said frames radially and sequentially directly attached to a non-stepping continuously rotating filter wheel that is positioned normal to the optical axis behind a lens transmitting telecentric or collimated light rays and in front of an image capture sensor;

then first synchronizing said non-stepping continuously rotating filter wheel's rotational position with an image capture signal;

then initiating said image capture signal at the time one of said filter segments enclosed in frames completely covers said image capture sensor; and, then terminating said image capture signal prior to said image capture sensor being covered by the next of said filter segments enclosed in frames.

2. The method of claim 1 wherein said filter segments enclosed in frames on said non-stepping continuously rotating filter wheel pass over said image capture sensor at a rate that matches the minimal time required by said image capture sensor to capture an image.

3. The method of claim 1 further comprising synchronizing said non-stepping continuously rotating filter wheel's rotational speed and said image capture signal with said non-stepping continuously rotating filter wheel's rotational position and capturing images while said image capture sensor is covered by two adjacent filter segments enclosed in frames.

4. The method of claim 1 further comprising interchangeable filter segments enclosed in frames that are variable in size and removably attached to said non-stepping continuously rotating filter wheel.

* * * * *